United States Patent [19]

Shoji et al.

[11] Patent Number: 4,828,924

[45] Date of Patent: May 9, 1989

[54] MAGNETIC RECORDING MEDIUM

[75] Inventors: Mitsutoshi Shoji; Koo Honjoo, both of Ibaragi; Yoshiharu Honma; Fumio Nakano, both of Hitachi; Toshikazu Narahara, Ibaragi, all of Japan

[73] Assignee: Hitachi Maxell, Ltd., Osaka, Japan

[21] Appl. No.: 114,845

[22] Filed: Oct. 30, 1987

Related U.S. Application Data

[63] Continuation-in-part of Ser. No. 924,257, Oct. 29, 1986, abandoned.

[30] Foreign Application Priority Data

Oct. 29, 1985 [JP] Japan ................................ 60-242317

[51] Int. Cl.$^4$ ................................................ G11B 5/70
[52] U.S. Cl. .................................... 428/422; 427/128; 428/694; 428/695; 428/900
[58] Field of Search ............... 428/694, 422, 695, 900; 427/131, 128

[56] References Cited

U.S. PATENT DOCUMENTS

| 3,490,946 | 1/1970 | Wolff | 428/422 |
| 3,778,308 | 12/1973 | Roller | 428/421 |
| 4,120,995 | 10/1978 | Phipps | 428/328 |
| 4,232,072 | 11/1980 | Pardee | 428/65 |
| 4,268,556 | 5/1981 | Pedrotty | 428/695 |
| 4,327,139 | 4/1982 | Schaefer | 428/695 |
| 4,446,193 | 5/1984 | Afzali-Ardakaui | 428/422 |
| 4,536,444 | 11/1984 | Sumiya | 428/695 |
| 4,642,246 | 2/1987 | Janssen | 427/131 |
| 4,692,378 | 9/1987 | Ishihara | 428/422 |
| 4,696,845 | 9/1987 | Yanagisawa | 428/900 |

FOREIGN PATENT DOCUMENTS

| 1113124 | 5/1986 | Japan | 428/694 |
| 1120340 | 6/1986 | Japan | 427/128 |

Primary Examiner—Paul J. Thibodeau
Attorney, Agent, or Firm—Birch, Stewart, Kolasch & Birch

[57] ABSTRACT

A magnetic recording medium of high durability comprising a substrate material and a magnetic layer provided on at least one surface of the substrate material, the magnetic layer comprising magnetic powder and a resinous binder, characterized in that the magnetic layer comprises further at least one compound of the formula:

$$Rf-CH_2-(R)_mX \qquad (I)$$

wherein Rf is a fluorinated polyoxyalkyl group having 8 to 152 carbon atoms, R is an oxyalkylene group having 2 or 3 carbon atoms, X is a polar group such as —OH, —OCH$_3$, -O-lower alkylene-COOH or -O-CO-lower alkylene-OH and m is an integer of not less than 1 uniformly and entirely dispersed in the magnetic layer.

4 Claims, No Drawings

MAGNETIC RECORDING MEDIUM

This is a continuation-in-part application of our co-pending application Ser. No. 924,257 filed on Oct. 29, 1986 now abandoned.

BACKGROUND OF THE INVENTION

The present invention relates to a magnetic recording medium, particularly excellent in durability.

PRIOR ART DISCUSSION

Generally, a magnetic recording medium such as a magnetic recording film or a magnetic recording disc is produced by application of a magnetic coating composition comprising magnetic powder and a resinous binder dispersed or dissolved in an organic solvent onto a base material (e.g. plastic film, plastic sheet, plastic plate) to form a magnetic layer. Since the magnetic layer moves slidably in a state of close contact with a magnetic head and a guide part on recording and reproducing, its surface tends to be seriously abraded. Because of this reason, there is always present a high demand towards a magnetic recording medium which resists abrasion and has excellent durability.

In recent years, a vertical magnetic recording system with a ferromagnetic thin layer has been developed, and even a magnetic recording medium of application type usually having a relatively high durability is made with the packing density of the magnetic powder higher and the thickness of the magnetic layer smaller in order to attain high density recording. Due to such construction, the durability tends to be lowered. A magnetic recording disc is particularly required to have a higher durability, because it is used under a sliding condition more drastic than that under which a magnetic recording tape is used.

For improvement or enhancement of the durability, a variety of lubricants have been applied onto a magnetic layer. For instance, application of the following fluorinated lubriccants onto the surface of a magnetic layer has been proposed: perfluoroalkyl polyether lubricants (U.S. Pat. No. 3,490,946), fluorinated surfactants of the formula: $C_nF_{2n+1}X$ (wherein X is a polar group such as $-SO_3K$, $-SO_3Na$, $-SO_3F$, $-COONH_4$, $-COOH$, $-SO_3H$ or $-OH$ and n is an integer of 4 to 13) or of the formula: $C_nF_{2n+1}OCH_2OO-(RO)_{\overline{m}}H$ (wherein R is an alkylene group having 3 or 4 carbon atom, n is an integer of 5 to 13 and m is such a number that the molecular weight of the polyoxyalkylene chain corresponds to 20–80% of the total molecular weight) (Japanese Patent Publications (unexamined) Nos. 116931/84, 41431/83, 29147/83, 154619/82 and 44226/82), perfluoropolyether lubricants having a total number of fluorine and cabon atoms of 14 to 50 (U.S. Pat. No. 3,778,308), perfluoropolyether carboxylic acids comprising a fluorinated polyoxyalkyl chain having 21 to 65 carbon atoms and a carboxyl group present at the terminal position of the chain (Japanese Patent Publication (unexamined) No. 85929/83), etc.

Application of perfluoroalkyl polyether lubricants onto the surface of a magnetic layer is quite effective in enhancement of the lubricating effect at the initial stage. After expiration of a long period of time, however, those lubricants are eliminated from the magnetic layer, and the lubricating effect is greatly reduced. The fluorinated surfactants are hardly eliminated from the magnetic layer even after a long period of time, but their use does not give a sufficient lubricating effect, because the carbon number in the fluorinated alkyl group is too small. The perfluoropolyether lubricants show good lubrication effect, but their adhesion onto the surface of a magentic layer is not sufficiently good, and a satisfactory durability can not be obtained. The perfluoropolyether carboxylic acids make the coefficient of friction at the surface of a magnetic layer considerably smaller, but this effect can not be maintained over a long period of time because of their elimination.

SUMMARY OF THE INVENTION

As a result of extensive study, it has now been found that incorporation of a certain lubricating substance into a magnetic layer can exert an excellent lubricating effect over a long period of time, such that the durability of the magnetic layer is markedly improved and enhanced. This invention is based on the above finding.

According to the present invention, there is provided a magnetic recording medium of high durability comprising a substrate material and a magnetic layer provided on at least one surface of the substrate material, the magnetic layer comprising magnetic powder and a resinous binder, characterized in that said magnetic layer comprises additionally at least one compound of the formula:

$$Rf-CH_2-(R)_{\overline{m}}X \qquad (I)$$

wherein Rf is a fluorinated polyoxyalkyl group having 8 to 152 carbon atoms, R is an oxyalkylene group having 2 or 3 carbon atoms, X is a polar group such as $-OH$, $-OCH_3$, $-O-$lower alkyllene$-COOH$ or $-O-CO-$lower alkylene$-OH$ and m is an integer of not less than 1, uniformly and entirely dispersed in the magnetic layer.

DETAILED DESCRIPTION OF THE INVENTION

The compound of the formula (I) is usually a viscous, oily fluid at room temperature under atmospheric pressure. Its molecule comprises three kinds of moieties having different properties, i.e. a long chain fluorinated polyoxyalkylene group, a non-fluorinated oxyalkylene group and a polar group. Due to the polar group present at the terminal position, the compound (I) can be readily adsorbed onto the magnetic powder in the magnetic layer. The non-fluorinated oxyalkylene group is compatible with the resinous binder in the magnetic layer so that the compound (I) can be firmly retained in the magnetic layer. The long chain fluorinated polyoxyalkylene group in the compound (I) thus fixed in the magnetic layer is arranged at the surface of the magnetic layer and exerts excellent lubricating function. When the compound (I) is included in the magnetic layer on formation of the magnetic layer or by application of as a solution in an organic solvent onto the magnetic layer as previously formed, the compound (I) is firmly fixed in the magnetic layer and continues its excellent lubricating function over a long period of time according to the mechanism as explained above, whereby the durability of the magnetic layer is improved and enhanced.

Preferred examples of the compound (I) are those of the following formulas:

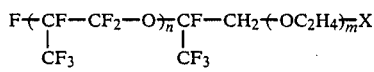

and

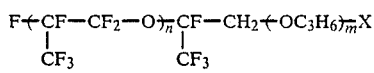

wherein n is an integer of not less than 1, particularly from 2 to 50, m is an integer of not less than 1, particularly from 2 to 20, and X is as defined above.

The amount of compound (I) is the magnetic layer is usually from about 0.1 to 20 parts by weight, preferably from about 0.5 to 5 parts by weight, to 100 parts by weight of the magnetic powder. When the amount is smaller than the lower limit, the desired improvement or enhancement of the durability is not achieved. When the amount is larger than the upper limit, the surface state of the magnetic layer is deteriorated, and drop-out and noise are apt to be produced.

The magnetic recording medium of the invention may be produced, for instance, by applying a magnetic coating composition comprising compound (I) onto a substrate material, followed by drying to form a magnetic layer. The magnetic recording medium may be also produced by applying a magnetic coating composition not comprising compound (I) onto a substrate material and drying to form a magnetic layer, onto which a solution of the compound (I) in an appropriate solvent (e.g. Freon) may be applied by brushing, spraying, dipping or the like. The thus formed magnetic layer comprising compound (I) has usually a thickness of about 0.3 to 5 μm, preferably 1 to 3 μm.

After formation of the magnetic layer comprising the compound (I) as above desorbed, the resulting product may be subjected to any post-treatment by a per se conventional procedure such as calendering or cutting.

The substrate material is made of a metal, a polymeric material or the like and usually shaped in the form of a plate, sheet or film. Examples of the polymeric material are polyesters (e.g. polyethylene terephthalate, polyethylene-2,6-naphthalate), polyolefins (e.g. polyethylene, polypropylene), cellulose acetates (e.g. cellulose triacetate, cellulose diacetate), polyamides, polyimides, etc. The substrate may have a thickness of about 10 to 100 μm.

The magnetic coating composition may comprise magnetic powder and a resinous binder in a solvent. The magnetic powder has usually an average particle size (long axis) of about 0.1 to 0.4 μm. Examples of the magnetic powder are metal particles (e.g. metallic iron, metallic cobalt, iron or cobalt alloy), metal oxide particles (e.g. gamma-$Fe_2O_3$, $Fe_3O_4$, their intermediary oxides, their cobalt-modified products, barium ferrite, strontium ferrite), etc. Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, radioactive ray-curable resin, etc. A crosslinking agent such as a low molecular weight isocyanate compound may be optionally used in combination with them. Examples of the solvent are toluene, xylene, methylethylketone, cyclohexanone, etc. The amount of the magnetic powder may be normally from 50 to 90% by weight on the basis of the combined amount of the magnetic powder and the resinous binder. The weight proportion of the magnetic powder and the compound (I) may be usually from about 100:0.1 to 100:20, preferably from about 100:0.5 to 5.

PREFERRED EMBODIMENTS OF THE INVENTION

Practical and presently preferred embodiments of the invention are illustratively shown in the following Examples wherein part(s) and % are by weight unless otherwise indicated.

EXAMPLES 1 TO 8

A resinous binder comprising bisphenol type epoxy resin (45 parts), a resol type phenol resin (40 parts) and a polyvinyl butyral resin (15 parts) was dissolved in cyclohexanone (400 parts), gamma-$Fe_2O_3$ powder (150 parts) was added thereto, and the resultant mixture was kneaded well in a ball mill for 70 hours to give a dispersion (a).

Separately, the compound (I) as shown in Table 1 (2 parts) was dissolved in a mixture of N-methyl-2-pyrrolidone (100 parts) and trichlorotrifluoroethane (20 parts) to give a solution (b).

The dispersion (a) and the solution (b) were mixed together in a ball mill to make a magnetic coating composition. The magnetic coating composition was applied onto a cleaned surface of an aluminum plate (thickness, 90 μm) in a disc form, followed by treatment for orientation of the magnetic powder and curing at 200° C. for 2 hours to form a magnetic layer of 3 μm in thickness, whereby a magnetic recording disc was obtained.

TABLE 1

| Example | Compound (I) | Molecular weight | Viscosity (100° F.) (cST) |
| --- | --- | --- | --- |
| 1 or 9 | $F(CF-CF_2-O)_{14}CF-CH_2(O-C_2H_4)_6OH$ with $CF_3$ branches | 2738 | 180 |
| 2 or 10 | $F(CF-CF_2-O)_{14}CF-CH_2(O-C_2H_4)_4OCH_3$ with $CF_3$ branches | 2664 | 165 |
| 3 or 11 | $F(CF-CF_2-O)_{14}CF-CH_2(O-C_2H_4)_6O-CO-CH_2CH_2-OH$ with $CF_3$ branches | 2818 | 185 |

TABLE 1-continued

| Example | Compound (I) | Molecular weight | Viscosity (100° F.) (cST) |
|---|---|---|---|
| 4 or 12 | $F{-}(CF(CF_3){-}CF_2{-}O)_{14}{-}CF(CF_3){-}CH_2{-}(O{-}C_2H_4)_{5}OCH_2{-}COOH$ | 2760 | 180 |
| 5 or 13 | $F{-}(CF(CF_3){-}CF_2{-}O)_{14}{-}CF(CF_3){-}CH_2{-}(O{-}C_3H_6)_{10}{-}O{-}CO{-}CH_2CH_2{-}OH$ | 3096 | 205 |
| 6 or 14 | $F{-}(CF(CF_3){-}CF_2{-}O)_{26}{-}CF(CF_3){-}CH_2{-}(O{-}C_2H_4)_{6}OH$ | 4730 | 310 |
| 7 or 15 | $F{-}(CF(CF_3){-}CF_2{-}O)_{26}{-}CF(CF_3){-}CH_2{-}(O{-}C_3H_6)_{10}{-}O{-}CO{-}CH_2CH_2{-}OH$ | 5082 | 350 |
| 8 or 16 | $F{-}(CF(CF_3){-}CF_2{-}O)_{41}{-}CF(CF_3){-}CH_2{-}(O{-}C_2H_4)_{4}OCH_3$ | 7146 | 1000 |

EXAMPLES 9 TO 16

The following materials were mixed well in a ball mill for 100 hours to give a dispersion (c):

| Material | Part(s) |
|---|---|
| gamma-Fe$_2$O$_3$ powder | 68 |
| Vinyl chloride/vinyl acetate/vinyl alcohol copolymer | 26 |
| Butadiene/acrylonitrile copolymer | 5 |
| (trifunctional low molecular weight isocyanate compound "Colonate L"; manufactured by Nippon Polyurethane Kogyo) | 2 |
| Carbon black | 7 |
| Methylisobutylketone | 75 |
| Toluene | 75 |

To the dispersion (c), the solution (b) containing the compound (I) as prepared in Example 1 (30 parts) were mixed together in a ball mill to make a magnetic coating composition. The magnetic coating composition was applied onto a surface of a polyester film (thickness, 75 μm) in a disc form, followed by drying to form a magnetic layer of 3 μm in thickness, whereby a magnetic recording disc was obtained.

COMPARATIVE EXAMPLE 1

In the same manner as in Example 1 but using the same amount of a perfluoroalkyl polyether "Klytocs 143AC" (manufactured by DuPont) in place of the compound (I), a magnetic coating composition was prepared. By the use of this magnetic coating composition, there was prepared a magnetic recording disc as in Example 1.

COMPARATIVE EXAMPLE 2

In the same manner as in Example 9 but using the same amount of "Klytocs 143 AC" in place of the compound (I), a magnetic coating composition was prepared. By the use of this magnetic coating composition, there was prepared a magnetic recording disc as in Example 9.

The magnetic recording discs as obtained in Examples and Comparative Examples were examined on their durability. The examination was carried out by setting the magnetic recording disc to be examined in a spherical surface sliding test machine, charging a load of 10 grams to the sliding element, slidably moving the magnetic recording disc and evaluating the durability by the total rotation number until breakage is produced on the magnetic layer. The results are shown in Table 2.

TABLE 2

| Example | Total rotation number |
|---|---|
| 1 | 78000 |
| 2 | 85000 |
| 3 | 90000 |
| 4 | 88000 |
| 5 | more than 92000 |
| 6 | 84000 |
| 7 | more than 92000 |
| 8 | more than 92000 |
| 9 | more than 92000 |
| 10 | more than 92000 |
| 11 | more than 92000 |
| 12 | more than 92000 |
| 13 | more than 92000 |
| 14 | more than 92000 |
| 15 | more than 92000 |
| 16 | more than 92000 |
| Comparative | |
| 1 | 20000 |
| 2 | 23000 |

As seen in Table 2, the magnetic recording discs according to the invention (Examples 1 to 16) give remarkably larger rotation numbers than conventional magnetic recording discs (Comparative Examples 1 and 2), from which it is understood that the magnetic recording discs of the invention have excellent durability.

The compound (I) used as a lubricant in this invention can be produced by reducing a carboxylic acid of the formula:

Rf—COOH　　　　(A)

(wherein Rf is as defined above) to the corresponding alcohol of the formula:

Rf—CH$_2$—OH　　　　(B)

(wherein Rf is as defined above), which is then reacted with an alkylene oxide to give the compound (I:

X=—OH). The compound (B) is alkalized and then reacted with polyalkylene glycol monoalkyl ether monohalide to give the compound (I): X=—O—alkyl). The compound (I: X=—OH) is reacted with an alkanolactone to give the compound (I: X=—O—CO—alkylene—OH). The compound (I: X=—OH) is oxidized to give the compound (I: X=—O—alkylene—COOH).

More specifically, a carboxylic acid of the formula:

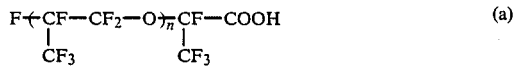

(a)

(wherein n is as defined above) is reduced with a metal hydride (e.g. lithium aluminum hydride) in an inert solvent at room temperature to give an alcohol of the formula:

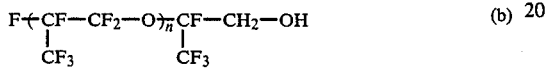

(b)

(wherein n is as defined above), which is then reacted with an alkylene oxide in the presence of a catalyst (e.g. boron trifluoride etherate, potassium hydroxide) in an inert solvent at a temperature of about 100° C. to give a compound of the formula:

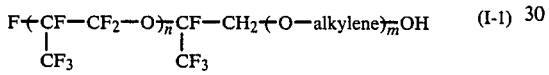

(I-1)

(wherein m and n are each as defined above).

To a solution of the alcohol (b) in an inert solvent, metallic sodium is added at a temperature of about 50° C., and the resultant alkalized product is reacted with a polyalkylene glycol monoalkyl ether monohalide to give a compound of the formula:

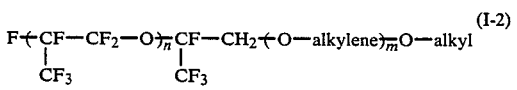

(I-2)

(wherein m and n are each as defined above).

The compound (I-1) is reacted with an alkanolactone in an inert solvent at about 100° C. to give a compound of the formula:

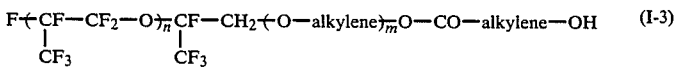

(I-3)

(wherein m and n are each as defined above).

The compound (I-1) is treated with an oxidizing agent (e.g. potassium permanganate) in an inert solvent at room temperature to give a compound of the formula:

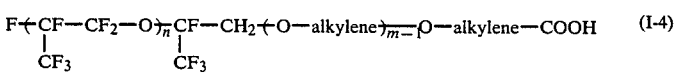

(I-4)

(wherein m and n are each as defined above).

The compound (I) as employed in Examples 1 to 16 are prepared by the following Reference Examples.

REFERENCE EXAMPLE 1

(Preparation of the compound (I) as employed in Examples 1, 6, 9 and 14)

Into a 500 ml volume flask, a 1N LiAlH$_4$ solution in dimethyl ether (25 ml; 0.025 mol) was charged, and a dispersion of "Claytox 157FS" (perfluoroalkylpolyether carboxylic acid; Grade L; manufactured by DuPont) (50 g; 0.02 mol) in a mixture of trichlorotrifluoroethane (200 g) and dimethyl ether (50 g) was dropwise added thereto. The resultant mixture was stirred at room temperature for 5 hours. The reaction product was washed with dilute hydrochloric acid to give a reduction product of "Claytox 157FS" of the formula:

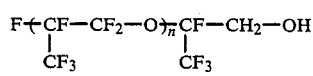

(wherein n is 14 in average).

The above obtained reduction product (25 g; 0.01 mol) was charged in a pressure-resistant vessel, and boron trifluoride etherate (1 g) as a catalyst was added thereto. The atmosphere of the vessel was replaced by nitrogen, and the temperature was lowered to 0°–5° C. Then, ethylene oxide (44 g; 1 mol) was dropwise added thereto. The resultant mixture was heated to 100° C., followed by stirring for 18 hours. From the reaction mixture, the catalyst was eliminated to give an objective compound of the formula:

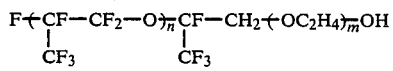

(wherein n is 14 in average and m is 6 in average).

In the same manner as above but using "Claytox 157FS" (perfluoroalkylpolyether carboxylic acid; Grade M; manufactured by DuPont) (90 g; 0.02 mol) in place of "Claytox 157FS" (Grade L) (50 g; 0.02 mol) to give an objective compound of the formula:

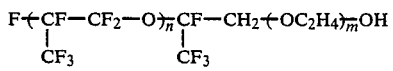

(wherein n is 26 in average and m is 6 in average).

REFERENCE EXAMPLE 2

(Preparation of the compound (I) as employed in Examples 2, 8, 10 and 16)

Into a flask, the reduction product of "Claytox 157FS" (Grade L) as obtained in Reference Example 1 (50 g; 0.02 mol) was charged, and xylene (200 g) and "Flutec PP3" (a fluorine-containing solvent; manufactured by ISC Chemical, U.K.) (300 g) were added thereto. The resultant mixture was heated at 50° C., during which metallic sodium (0.6 g; 0.26 mol) was portionwise added thereto, followed by stirring to give an alkalized product of the formula:

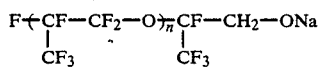

(wherein n is 14 in average).

To 550 g of the thus obtaind reaction mixture comprising 0.02 mol of the alkalized product, tetraethylene glycol monomethyl ether monoiodide ($CH_3O(CH_2CH_2O)_3CH_2CH_2I$) (1.7 g; 0.005 mol) was added, and the resultant mixture was heated at 100° to 120° C. for 12 hours. The reaction mixture was cooled to room temperature, washed with water and concentrated under reduced pressure to give an objective compound of the formula:

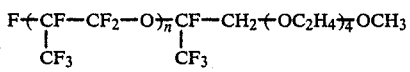

(wherein n is 14 in average).

In the same manner as above but using the reduction product of "Claytox 157FS" (perfluoroalkylpolyether carboxylic acid; Grade L; manufactured by DuPont) in place of the reduction product of "Claytox 157FS" (Grade L) to give an objective compound of the formula:

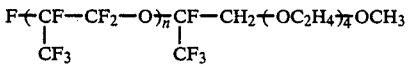

(wherein n is 41 in average).

REFERENCE EXAMPLE 3

(Preparation of the compound (I) as employed in Examples 3 and 11)

The compound of the formula:

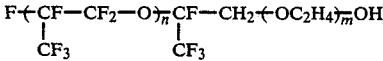

(wherein n is 14 in average and m is 6 in average) as obtained in Reference Example 1 (40 g; 0.016 mol), triethylene glycol dimethyl ether (200 ml) and "Flutec PP3" (50 ml) were charged in a flask euipped with a reflux condenser, and after replacement of the atmosphere by nitrogen gas, beta-propiolactone (1.4 g; 0.2 mol) was dropwise added thereto while stirring. Stirring was continued at 100° C. for 5 hours. The reaction mixture was cooled to room temperature, washed with water and purified by distillation in vacuo to give an objective compound of the formula:

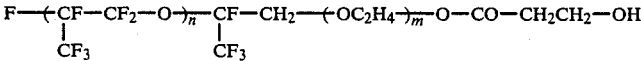

(wherein n is 14 in average and m is 6 in average).

REFERENCE EXAMPLE 4

(Preparation of the compound (I) as employed in Examples 4 and 12)

The compound of the formula:

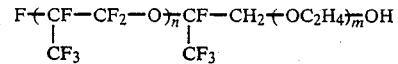

(wherein n is 14 in average and m is 6 in average) as obtained in Reference Example 1 (0.01 mol) was dissolved in a mixture of trichlorotrifluoroethane (300 g) and cyclohexyl 18 Crown 6 (10 g), and potassium permanganate (20 g) was added thereto. The resultant mixture was stirred at room temperature for 3 hours. The reaction mixture was washed with water and distilled in vacuo to give an objective compound of the formula:

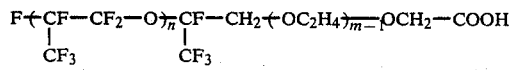

(wherein n is 14 in average and m is 6 in average).

REFERENCE EXAMPLE 5

(Preparation of the compound (I) as employed in Examples 5, 7, 13 and 15)

Into a 500 ml volume flask, a 1N $LiAlH_4$ solution in dimethyl ether (25 ml; 0.025 mol) was charged, and a dispersion of "Claytox 157FS" (perfluoroalkylpolyether carboxylic acid; Grade M; manufactured by DuPont) (90 g; 0.02 mol) in a mixture of trichlorotrifluoroethane (200 g) and dimethyl ether (50 g) was dropwise added thereto. The resultant mixture was stirred at room temperature for 5 hours. The reaction product was washed with dilute hydrochloric acid to give a reduction product of "Claytox 157FS" of the formula:

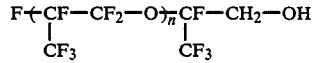

(wherein n is 26 in average).

The above obtained reduction product (45 g; 0.01 mol) was charged in a pressure-resistant vessel, and potassium hydroxide (1 g) as a catalyst was added thereto. The atmosphere of the vessel was replaced by nitrogen, and the temperature was lowered to 0°-5° C. Then, propylene oxide (23 g; 0.4 mol) was dropwise added thereto. The resultant mixture was heated to 100° C., followed by stirring for 20 hours. From the reaction mixture, the catalyst was eliminated to give a compound of the formula:

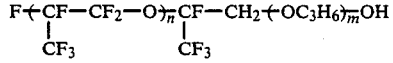

(wherein n is 26 in average and m is 10 in average).

The above obtained compund (0.016 mol) was charged in a flask equipped with a reflux condenser, and triethylene glycol dimethyl ether (200 ml) and "Flutec PP3" (50 ml) were added thereto. After replacement of the atmosphere by nitrogen gas, the resultant mixture was stirred well, during which beta-propiolactone (0.2 mol) was dropwise added thereto. The resultant mixture was heated at 100° C. for 5 hours. The reaction mixture was cooled to room temperature, washed with water and purified by distillation in vacuo to give an objective compound of the formula:

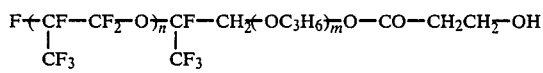

(wherein n is 26 in average and m is 10 in average).

In the same manner as above but using "Claytox 157FS" (Grade L) in place of "Claytox 157FS" (Grade M), there was obtained an objective compound of the formula:

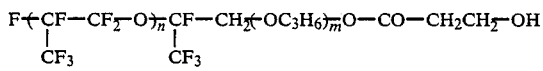

(wherein n is 14 in average and m is 10 in average).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium of high durability comprising a substrate material and a magnetic layer provided on at least one surface of said substrate material, said magnetic layer comprising magnetic powder and a resinous binder, characterized in that said magnetic layer comprises further at least one compound of the formula:

 (I)

wherein Rf is a fluorinated polyoxyalkyl group having 8 to 152 carbon atoms, R is an oxyalkylene group having 2 or 3 carbon atoms, X is a polar group selected from the group consisting of —OH, —OCH$_3$, —O-lower alkylene-COOH and —O-CO-lower alkylene-OH and m is an integer of not less than 1, uniformly and entirely dispersed in the magnetic layer, the amount of compound (I) in the magnetic layer ranging from about 0.1 to 20 parts by weight to 100 parts by weight of said magnetic powder.

2. The magnetic recording medium according to claim 1, wherein compound (I) is of the formula:

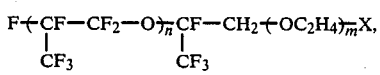

wherein n is an integer of not less than 1, and m is an integer of not less than 1.

3. The magnetic recording medium according to claim 1, wherein compound (I) is of the formula:

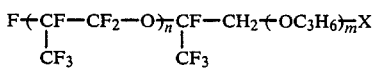

wherein n is an integer of not less than 1, and m is an integer of not less than 1.

4. The magnetic recording medium according to claim 1, wherein the amount compound (I) in the magnetic layer is from about 0.5 to 5 parts by weight to 100 parts by weight of the magnetic powder.

* * * * *